United States Patent [19]

Drake et al.

[11] Patent Number: 4,503,170

[45] Date of Patent: Mar. 5, 1985

[54] SHEAR THICKENING FLUID

[75] Inventors: Evelyn N. Drake, Plainfield, N.J.; Mary E. Morrison; Charles R. Dawson, both of Houston, Tex.

[73] Assignee: Exxon Production Research Co., Houston, Tex.

[21] Appl. No.: 400,526

[22] Filed: Jul. 21, 1982

Related U.S. Application Data

[63] Continuation-in-part of Ser. No. 79,436, Sep. 27, 1979, abandoned.

[51] Int. Cl.³ .......................... C08L 3/34; C08L 5/01; C08K 7/00; C08K 3/34
[52] U.S. Cl. .................................. 523/130; 166/270; 166/273; 166/292; 166/293; 166/294; 166/295; 252/8.5 R; 523/334; 524/104; 524/430; 524/446
[58] Field of Search ........... 252/8.5 BC, 8.5 P, 8.5 A, 252/8.5 B, 8.55 R; 523/130, 334; 524/430, 104, 446; 166/270, 273, 292, 293, 294, 295

[56] References Cited

U.S. PATENT DOCUMENTS

| | | | |
|---|---|---|---|
| Re. 27,888 | 1/1974 | Li | 208/308 |
| Re. 29,716 | 8/1978 | Clampitt et al. | 166/270 |
| 2,748,867 | 6/1956 | Lissaut | 166/309 |
| 2,775,557 | 12/1956 | Morgan | 260/29.6 H |
| 2,836,555 | 5/1958 | Armentrout | 166/292 |
| 2,868,753 | 1/1959 | Morgan | 260/42.13 |
| 2,890,169 | 6/1959 | Prokep | 166/293 |
| 3,028,913 | 4/1982 | Armentrout | 166/292 |
| 3,070,543 | 12/1962 | Scott | 252/8.5 A |
| 3,081,260 | 3/1963 | Park | 252/8.5 C |
| 3,082,823 | 3/1963 | Hower | 166/294 |
| 3,323,603 | 6/1967 | Lummas | 175/65 |
| 3,396,105 | 8/1968 | Burdyn et al. | 252/8.5 P |
| 3,396,790 | 8/1968 | Eaton | 166/270 |
| 3,407,878 | 10/1968 | Engle | 166/294 |
| 3,420,299 | 1/1969 | Cloud | 166/293 |
| 3,448,800 | 6/1969 | Parker et al. | 166/294 |
| 3,558,545 | 1/1971 | Lummus | 260/29.6 H |
| 3,617,546 | 11/1971 | Li et al. | 210/22 |
| 3,676,363 | 7/1972 | Mosier | 252/316 |

(List continued on next page.)

FOREIGN PATENT DOCUMENTS

| | | |
|---|---|---|
| 1070235 | 1/1980 | Canada . |
| 1070236 | 1/1980 | Canada . |
| 2008171 | 5/1979 | United Kingdom . |
| 2018737 | 2/1980 | United Kingdom ........... 260/29.6 S |
| 492646 | 12/1975 | U.S.S.R. ............................... 166/294 |

OTHER PUBLICATIONS

Derwent Abst. (SU-629322) Perm. Petrol Ind. Res. 59298B/32, Sep. 6, 1978, "Plugging Soln. TM . . . n".
Derwent Abst. 36479y/21 (DL-124430) (2-23-77) Orko/CC, "Non-Disp. Polym. . . . contg Bentonite and Acrylamide Polym.".

*Primary Examiner*—Herbert J. Lilling
*Attorney, Agent, or Firm*—David H. Vickrey

[57] ABSTRACT

The instant invention is directed to shear thickening fluids to prevent unwanted flow in wells penetrating subterranean formations. The shear thickening fluids comprise (1) a water swellable granular clay present in sufficient quantity so that, upon interaction with an aqueous phase, a stiff paste rapidly forms having a strength of at least 2000 lbs/100 ft², (2) a nonaqueous phase comprising a hydrocarbon material and a surfactant, and (3) an aqueous phase comprising water and a watersoluble polymer. The granular clay and water-polymer solution are kept separated by the intervening hydrocarbon-surfactant composition, which is the continuous phase. The intervening oil phase prevents the interaction between the water-polymer phase and the granular clay and results in a stable, nonreacting, pumpable composite until such time as the granular clay is fragmented by application of a sufficiently high shear force. Upon such fragmenting, the clay and aqueous phase intereact resulting in a semi-rigid high strength paste which plugs any unwanted flow.

33 Claims, 10 Drawing Figures

U.S. PATENT DOCUMENTS

| | | | |
|---|---|---|---|
| 3,696,028 | 10/1972 | Li et al. | 208/308 |
| 3,713,915 | 1/1973 | Fast | 149/2 |
| 3,718,187 | 2/1973 | Milton | 165/295 |
| 3,719,590 | 3/1973 | Li et al. | 208/308 |
| 3,746,725 | 7/1973 | Gilers et al. | 260/29.6 E |
| 3,779,907 | 12/1973 | Li et al. | 210/22 |
| 3,816,308 | 6/1974 | Blanc | 260/29.6 S |
| 3,838,047 | 9/1974 | Le Blanc | 260/29.6 S |
| 3,880,764 | 4/1975 | Denham | 252/8.5 A |
| 3,893,510 | 7/1975 | Elphingstone et al. | 166/294 |
| 3,943,083 | 3/1976 | Adams et al. | 260/29.6 S |
| 3,949,560 | 4/1976 | Clem | 166/305 D |
| 3,958,638 | 5/1976 | Johnston | 166/295 |
| 3,976,580 | 8/1976 | Kaminstein et al. | 252/316 |
| 3,985,659 | 10/1976 | Feiretta | 252/8.5 C |
| 4,001,109 | 1/1977 | Li et al. | 210/22 |
| 4,036,301 | 7/1977 | Powers et al. | 166/293 |
| 4,040,967 | 8/1977 | Nimerick et al. | 260/29.66 B |
| 4,042,031 | 8/1977 | Knapp | 166/276 |
| 4,056,462 | 11/1977 | Li et al. | 208/308 |
| 4,064,040 | 12/1977 | Singhal et al. | 210/22 R |
| 4,086,163 | 4/1978 | Cahn et al. | 210/22 D |
| 4,182,417 | 1/1980 | McDonald et al. | 166/295 |
| 4,190,110 | 2/1980 | Beirute | 166/291 |
| 4,391,925 | 7/1983 | Mintz et al. | 523/130 |

PASTE STRENGTH OF GRANULAR BENTONITE L.M. SHEAR THICKENING FLUID AS A FUNCTION OF LOW SHEAR MIXING TIME BEFORE AND AFTER PASSAGE THROUGH A HIGH SHEAR NOZZLE (1)

(1) BASIC FORMULATION:
    37.5 g OIL (21.7% PARANOX-106 IN S100N)
    75.0 g KWK VOLCLAY
    125.0 g 1% P-250

PASTE STRENGTH OF GRANULAR BENTONITE L.M. SHEAR THICKENING FLUID AS A FUNCTION OF LOW SHEAR MIXING TIME BEFORE AND AFTER PASSAGE THROUGH A HIGH SHEAR NOZZLE (1)

(1) BASIC FORMULATION:
37.5 g OIL (43.4% PARANOX-106 IN S100N)
75.0 g KWK VOLCLAY
125.0 g 1% P-250

LOW SHEAR THICKENING TIMES AND PASTE STRENGTHS AFTER HIGH SHEAR OF GRANULAR BENTONITE L.M. SHEAR THICKENING FLUID AS A FUNCTION OF $H_2O$/CLAY WEIGHT RATIO*

*FIXED SURFACTANT/CLAY (0.11), OIL/CLAY (0.39), AND POLYMER/CLAY (0.0167) WEIGHT RATIOS

LOW SHEAR THICKENING TIMES AND PASTE STRENGTHS AFTER HIGH SHEAR OF GRANULAR BENTONITE L.M. SHEAR THICKENING FLUID AS A FUNCTION OF (OIL+SURF)/CLAY WEIGHT RATIO*

KING RANCH, TEXAS

*FIXED WATER/CLAY (1.65) AND POLYMER/CLAY (0.0167) WEIGHT RATIOS; (OIL+SURF) = 30% PARANOX-106 ("OCTOBER SURF") IN S100N; TRUCKED WATER CONTAINING A SUBSTANTIAL AMOUNT OF RUST

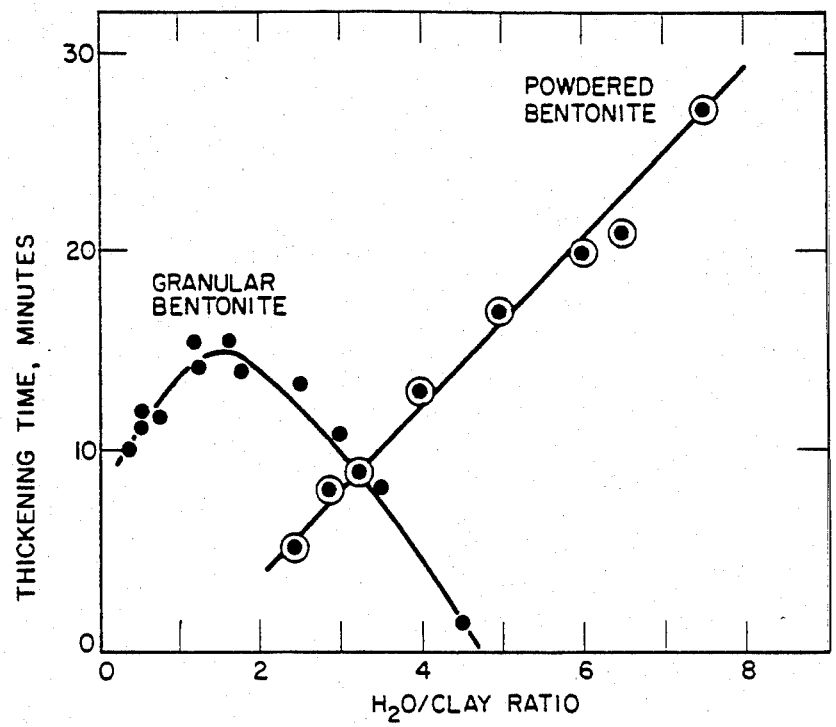

SHEAR THICKENING FLUID

CROSS-REFERENCE TO RELATED APPLICATION

This application is a continuation-in-part of U.S. patent application Ser. No. 079,436, filed Sept. 27, 1979, and now abandoned.

BACKGROUND OF THE INVENTION

During drilling or production of an oil or gas well, there are occasionally unwanted fluid flows in or near the wellbore. There are also occasionally channels open downhole where unwanted flow could take place. On these occasions, it may be necessary to introduce fluids into the well to kill the well, or at the very least, terminate the unwanted flow or seal the unwanted channels. Examples of these problems are:

unwanted influx of formation fluid into the wellbore (blowout),
loss of drilling fluid into fractures or into vugs in the formation (lost circulation),
channels in cement behind casing,
holes in casing, and
improperly sealing liner hangers.

A typical scenario involves formation fluid influx into the wellbore which cannot be contained by closing the blowout preventers or by circulating the high density drilling mud. For example, when an unusually high pressure formation is encountered, it may be necessary to employ drilling mud at such a high weight that a formation above the high pressure zone is fractured. This fractured zone then becomes a "lost zone" (thief zone) into which mud flows at such a high rate that circulation is lost. The lost circulation may be so severe that it ultimately becomes impossible to maintain a column of mud above the high pressure zone sufficient to impart the necessary hydrostatic head to offset the high pressures in the high pressure zone. As this occurs, the well becomes increasingly susceptible to blowout into the lost zone or to the surface.

There are a number of techniques which are employed when one or another of these problems are encountered. A common solution is to force a cement slurry into the unwanted flow channel. This procedure is often successful as long as there is no significant flow present in the unwanted channel, although multiple treatments may be necessary. Cement is useless against a pre-established flow because cement has almost no flow resistance until it is set. Thus it is always necessary to stop the flow before using cement to plug the flow channel.

The hydrostatic head of various fluids is often employed to prevent or stop unwanted movement of fluids up the wellbore. In particular, most blowouts involve the uncontrolled flow of formation fluids into the wellbore and then upwards in the wellbore. This type of blowout can be controlled by injecting fluid at the proper density and rate into the wellbore at or near the point of influx. In practice the required density and rate may be difficult to obtain.

One technique involves placing a high density barite (barium sulfate) slurry in the annulus just above the high pressure zone to provide the extra hydrostatic head needed to stop or prevent formation fluid influx. If the barite slurry remains deflocculated after placement at the bottom of the well and relatively undisturbed, the barite settles uniformly to form a hard plug. One problem with using barite to form a plug, however, is the barite's ability to form a plug varies greatly depending upon the formation temperature, the operating conditions, and the quality of barite used. For example, it is sometimes difficult to plug a well in the presence of a significant flow movement in the wellbore. If the fluid influx is not killed immediately by the hydrostatic head of the barite slurry, the settling barite will usually not stop the unwanted flow.

The unwanted loss of fluids from the wellbore is often treated by injecting a slurry of fiberous, lumpy, or flakey material into the wellbore at the region of the loss. These "lost circulation materials" are intended to plug or bridge over, i.e., form a mat over, the channels through which the fluid is entering the rock.

A pasty material known as "gunk" is sometimes used as a lost circulation material and occasionally to form temporary plugs in the wellbore. Gunk is a slurry of dry powdered bentonite in diesel oil. A typical gunk recipe is 350 lbs of bentonite in a barrel of diesel oil. This slurry is quite fluid when mixed and remains fluid as long as it is kept dry. Mixing gunk slurry with an approximately equal volume of water causes the clay to hydrate giving a stiff paste. If formed at the right time and at the right place, this gunk paste is an effective lost circulation and plugging material. However, since the gunk slurry will hydrate and thicken immediately upon contacting water, it must be kept dry until it has been pumped downhole to the place where a plug is desired. The mixing of the gunk slurry with water takes place downhole as the two fluids are commingled. In some cases, there is some control over the ratio of gunk slurry to water, in other cases, this control cannot be achieved. Since gunk only achieves adequate flow resistance to form a plug within a certain range of gunk/water ratios, the performance of gunk as a plugging agent has been erratic. In particular, gunk is seldom useful for blowout control because the requirement of having the proper gunk/water ratio is difficult to satisfy.

BRIEF SUMMARY OF THE INVENTION

The instant invention is directed to shear thickening fluids, which may be used for plugging flow channels in or near wellbores. These fluids comprise: (1) a water-swellable, granular clay having a particle size of 10–60 mesh (Tyler), present in sufficient quantity so as to be capable of rapidly forming a paste having a shear strength of at least 2000 lbs/100 ft$^2$ upon interaction with an aqueous phase (preferable clays include any of the known hydratable clays such as bentonite); (2) a nonaqueous hydrophobic (or oil) phase which comprises a liquid hydrocarbon component and a surfactant; and (3) an aqueous phase which comprises water and a water soluble polymer which, when permitted to interact with the clay, results in a semi-rigid, high-strength paste.

The granular clay is suspended in the oil phase and the aqueous phase is also suspended as discrete droplets in the oil phase so that the oil phase is the continuous phase, the system being identified as a granular clay oil external system.

The granular clay and the aqueous phase are kept separate from each other by the intervening oil phase until such time as their interaction is desired. Such interaction is effected by applying a shear force which is sufficient to fragment the clay granules, thereby exposing more clay surface area than can be covered by the oil phase and allowing polymer-containing water to contact the clay. This mixing of clay and water results in the formation of a novel paste having a strength of at least 2000 lbs/100 ft².

A shear force which is sufficient to fragment the clay and cause mixing of the water phase with the clay can be encountered by the fluid composite upon passage through the orifices of a drill bit or nozzle or by the application of a sufficiently high pumping velocity during pipe flow.

In drilling operations, this shear-thickening fluid is pumped down the drill pipe only when necessary for the specific purpose of controlling a blowout or sealing off a zone of lost circulation or blocking some other unwanted flow path. This special lost circulation fluid should not be confused with typical drilling fluids containing clay, weighting material and water-polymer components.

Significantly, the fluid of the instant invention is stable to the forces exerted upon it during ordinary pumping down the well pipe; that is, the clay remains substantially separate from the aqueous phase during pumping. However, passing through the nozzles of the drill bit at a high differential pressure applies a force sufficient to fragment the clay and mix the clay and water-polymer components into a semi-rigid, high-strength paste capable of plugging the wellbore or sealing a circulation thief zone or other unwanted flow channel.

The stiff paste formed by this invention will have a shear strength in the range from 2000 to 30,000 lb/100 ft². The ability of this paste to resist flow in a particular flow channel will depend on well-known physical principles. In channels with circular cross-section, the pressure required to move a plug will be $$P = \frac{\tau L}{300D}$$

where
P is the differential pressure across the plug, in psi $\tau$ is the shear strength of the paste in lb/100 ft².
L is the length of the plug, in ft.
D is the diameter of the channel, in inches.

The instant stiff paste can also stop pre-existing unwanted flows provided that the paste is injected into the unwanted flow at an appropriately high rate and provided that the unwanted flow is existing through a flow channel long enough for a paste plug to be formed.

The exact placement of a paste plug in or near a wellbore will depend on the problem to be treated. For example, if unwanted fluid was entering the wellbore at the bottom and flowing uphole, the paste plug would be formed as close to the bottom of the hole as possible. On the other hand, if fluid was flowing downhole from and departing the wellbore undesirably into a thief formation, the composite would be pumped into the wellbore just above the thief zone so that the paste would be formed at the flow channels in that zone and plug them. Other possible uses of the present invention can also be envisioned, such as blocking channels in cement behind casing, repairing leaks in casing or tubing, placing temporary plugs in various places, etc.

DESCRIPTION OF THE FIGURES

FIG. 10 is a graph of the thickening time of a powdered bentonite well control fluid and a granular bentonite well control fluid as a function H₂O/clay ratio.

DESCRIPTION OF THE PREFERRED EMBODIMENTS

Figure 1:
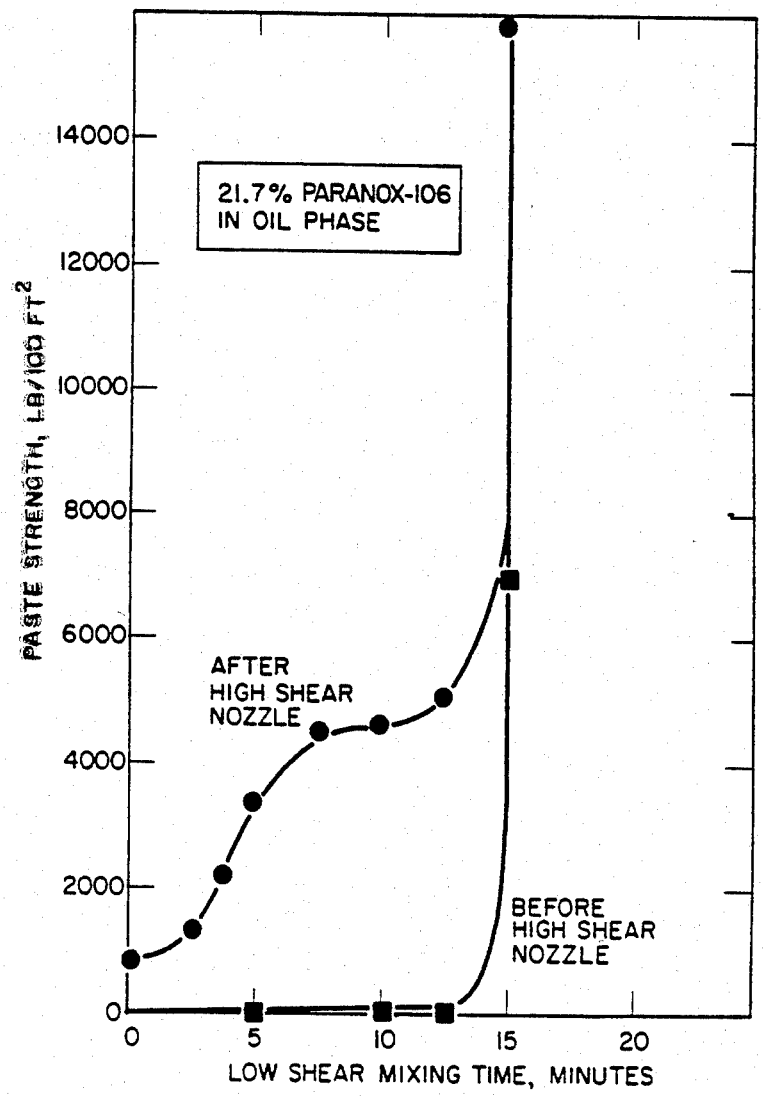
FIG. 1 is a graph of paste strength of a granular bentonite well control fluid which contains a 21.7% Paranox oil phase, as a function of low shear mixing time before and after high shear.

The fluid compositions of the instant invention solve a multitude of well-control problems, in particular the problems of thief zone control, and blowout control and prevention. A low viscosity material, stable to pumping, is pumped down a well pipe and forced through the orifices of a drill bit nozzle, or other means of causing a pressure drop, at a point where it is desired to plug the wellbore or thief zone. Upon being subjected to shear forces of sufficient intensity to fragment the granular clay particles and mix the clay and the water-polymer phase, the material sets up into an extremely high viscosity, semi-rigid, high-strength paste which itself can have a shear strength in excess of 2,000 pounds per 100 square feet.

The shear thickening fluids of the instant invention are a multicomponent composite, comprising a water swellable granular material (for the purposes of this specification, the term "clay" shall be employed) which can broadly be described as any clay which, in the presence of water, or of certain water-polymer materials employed here, swells into a high viscosity solid mass; a hydrophobic phase comprising a hydrocarbon component and a surfactant component; and an aqueous phase component made up of water and a water soluble polymer. Enough water swellable granular material is employed to result in the formation of a paste possessing a strength of at least 2000 lbs/100 ft.².

Preferred clays useful in the instant invention would include any members of the montmorrillonite (smectite) group or the attapulgite group. Clays which swell strongly and absorb large quantities of water will perform better in this invention than those which do not. Clays which have been chemically treated, as with soda ash or sodium polyacrylate, to increase their ability to absorb water and form a stiff paste will show improved performance in the instant invention.

In general, the hydrocarbon phase comprises a liquid oil, typically mineral oil, paraffinic oils of from 6 to 1000 carbons (provided they are liquid at the temperature at which they are employed—that is, during composite preparation and utilization), motor oils such as diesel fuel or keosene, paraffinic base oils having an appreciable aromatic content such as Mentor 28 and Mentor 32 which are available from Exxon Company, U.S.A., and substituted paraffinic oils wherein the substituents are selected from the group consisting of halogens, amines, sulfates, nitrates, carboxylates, and hydroxyls.

These hydrophobic nonaqueous materials are preferably mixed with oil soluble surfactants so as to enhance their surface activity. A wide variety of surfactants can be used in the instant invention. These surfactants include anionic, cationic, nonionic and ampholytic surfactants.

The only requirement which must be met by the surfactant is that it be able to stabilize the aqueous phase droplets and clay particles in the oil phase and thereby protect the mixture from premature gelling under low shear mixing or pumping conditions.

Anionic surfactants include carboxylic acids, i.e., fatty acids, resin acids, tall oil acids and acids from paraffin oxidation products. Also included among the anionic surfactants are alkyl sulfonates, alkylaryl sulfonates, mohogany and petroleum sulfonates, phosphates and lignin derivatives.

Cationic surfactants include quaternary ammonium compounds, e.g., salts of long chain primary, secondary and tertiary amies as well as quaternary amine salts with 7 to 40 carbon atoms. Styrene copolymers containing pendant quaternary ammonium groups including derivatives of trimethylamine or dimethylethanolamine are also useful cationic surfactants.

Unprotonated amines fall into the class of nonionic surfactants. A preferred group of amines have the general formula:

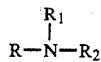

wherein R, $R_1$, and $R_2$ may be independently selected from the group consisting of hydrogen, $C_1$ to $C_{20}$ alkyl, $C_6$ to $C_{20}$ aryl and $C_7$ to $C_{20}$ alkylaryl radicals.

Various polyamine derivatives are useful within the scope of the instant invention. The preferred polyamine derivatives are those having the general formula:

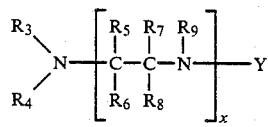

wherein $R_3$, $R_4$, $R_5$, $R_6$, $R_7$, $R_8$, $R_9$ and Y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof, and x is an integer of from 1 to 100. The substituted derivatives are preferably selected from the group consisting of oxygen, nitrogen, sulfur, phosphorus and halogen containing derivative. The most preferred material is:

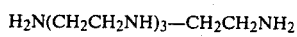

In general, the preferred surfactants are the products obtained by the reaction of the polyamine described above with various polyalkenyl succinic anhydrides, such as polyisobutylene succinic anhydride, polypropenyl succinic anhydride and polybutenyl succinic anhydride.

A preferred polyamine derivative formed by reacting together an alkyl succinic radical and the polyamine has the general formula:

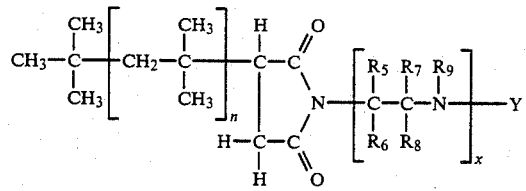

wherein n varies from 10 to 60, preferably 10 to 30, most preferably 15–17; x varies from 1 to 100, preferably 3 to 10; $R_5$, $R_6$, $R_7$, $R_8$, $R_9$ are hydrogen $C_1$ to $C_{20}$ alkyl, $C_6$ to $C_{20}$ aryl, $C_7$ to $C_{20}$ alkaryl radical and substituted derivative thereof, preferably hydrogen; and Y is selected from the group consisting of hydrogen and oxygen substituted hydrocarbyl radicals having up to 10 carbons, e.g., acetyl. Typically, the surfactants have a molecular weight on the order of about 1000. As previously stated, a most preferred characteristic of the surfactants is oil solubility.

Nonionic systems also include the polyethenoxy surfactants, i.e., polyethoxy ethers of alkyl phenols, polyethoxy ethers of alcohols, etc. The polyethenoxy ethers are especially useful in the invention as their solubility may be varied according to the weight of ethylene oxide added to the alkyl phenol starting material. Another nonionic surfactant which is particularly useful is sorbitan monooleate which is known in the trade by the name of Span-80 and manufactured by the Atlas Chemical Company. Ampholytic surfactants contain both an acidic and a basic function in their structure and therefore will be cationic or anionic according to the pH of the solution in which they are dissolved.

The final component of the shear sensitive well control fluids of the instant invention is an aqueous phase comprising water and a water-soluble polymer. Typical polymers include polyacrylamides including homopolymers, acrylamide lightly crosslinked by between about 500 and 5000 parts per million by weight of the monomers present with such agents as methylene-bisacrylamide or divinyl benzene, and a major portion of acrylamide copolymerized with a minor portion of other ethylenically unsaturated monomers copolymerizable therewith; or polystyrene sulfonate and polyvinyltoluene sulfonate and water soluble salts thereof; or polyethyleneoxide and polyvinyl alcohol. The preferred water-soluble polymer is polyacrylamide. These water soluble polymers are hydrolyzed to a degree ranging from 0–50%, preferably 0–15%, most preferably 1–7% or less.

The polyacrylamides and related polymers which can be used in the practice of the present invention include polymers selected from the group consisting of polyacrylamides and polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms, copolymers of acrylamide with another ethlenically unsaturated monomer copolymerizable therewith, sufficient acrylamide being present in the monomer mixture to impart said water soluble properties to the resulting copolymer when it is mixed with water, and wherein up to about 50 percent of the carboxamide groups can be hydrolyzed to carboxyl groups; and admixtures of such polymers. Presently preferred polyacrylamide type polymers include the various substantially linear homopolymers and copolymers of acrylamide and methacrylamide. By substantially linear it is meant that the polymers are substantially free of crosslinking between the polymer chains.

All the polymers useful in the practice of the invention are characterized by having high molecular weight. The molecular weight is not critical so long as the polymer is water soluble; however, it is preferred that the weight range between about 2-8 million, preferably 1 million. It is preferred that the polymer have a molecular weight of at least 100,000. The upper limit of molecular weight is unimportant so long as the polymer is at least water soluble.

The granular clay will be suspended in the oil phase while discrete droplets of the water-polymer phase will also be suspended in the oil phase. The discrete granular clay particles and water-polymer droplets exist as separate entities, separated by the suspending oil phase. Thus, the oil phase in this embodiment is the continuous phase.

The granular clay and the water-polymer phase are kept separated by the oil continuous phase until such time as their mixing to contact each other is desired. The desired mixing is accomplished by subjecting the composite to a shear force, such as the force encountered by passage through the nozzle of a drill bit, of sufficient intensity to fragment the granular clay. The fragmented clay particles have an increased surface area which is too great for the oil-surfactant phase to protect from the water-polymer phase. After the granular clay is fractured, the water-polymer phase is able to contact the fragmented clay and cause the clay to swell.

It has been discovered that granular clay may be used to form a shear thickening fluid which has both an oil continuous external phase before shearing and a sufficient quantity of clay to form a high strength paste after shearing. Clay is termed granular if it has a mean particle size of approximately 10–60 mesh (Tyler), more preferably 10–40 mesh, most preferably 20–40 mesh. The clay should preferably have removed from it fines of 100 mesh or finer. This results in a composite exhibiting greater low shear stability. The presence of an excessive amount of fine clay particles will cause premature thickening of the final composite.

Because of the resistance to hydration exhibited by granular clay, one can employ a greater loading of granular clay in the composite as compared to powdered clay. For those systems utilizing granular clay (particularly granular bentonite), the components are present in the composite in the following ranges:

| | | Parts By Weight |
|---|---|---|
| Compositions possessing 5 min. low shear stability, 2000 lb/100 ft.$^2$ paste strength after high shear | Granular Clay | 100 |
| | Surfactant | 5.5–29 |
| | Hydrocarbon oil | 25–130 |
| | Polymer | .1–6.7 |
| | Water | 25–400 |
| Compositions possessing 5 min. low shear stability, and 5000 lb/100 ft$^2$ paste strength after high shear | Granular Clay | 100 |
| | Surfactant | 5.5–25 |
| | Hydrocarbon oil | 25–110 |
| | Polymer | .1–6.7 |
| | Water | 50–350 |
| Preferred composition possession 5 min. low shear stability and 10,000 lb/100 ft$^2$ paste strength after high shear | Granular Clay | 100 |
| | Surfactant | 5.5–20 |
| | Hydrocarbon Oil | 25–75 |
| | Polymer | .1–6.7 |
| | Water | 100–300 |

In the preferred embodiment, the clay is a granular bentonite clay, the polymer is polyacrylamide, the hydrocarbon oil is a $C_{30}$ paraffinic hydrocarbon (available from Exxon Company, U.S.A. as S-100N), and the surfactant is chosen from the group of materials having formula corresponding to Surfactant A, previously defined.

Most preferably, polyamines of the formulas identified below as Surfactant $A_1$ and Surfactant $A_2$ are employed.

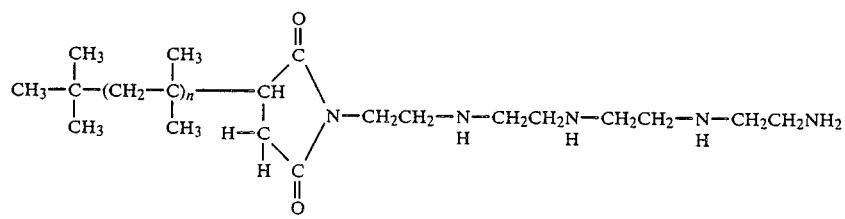

Surfactant $A_1$

The polyamine identified as Surfactant $A_1$ is available as Paranox 100 from Exxon Chemical Company.

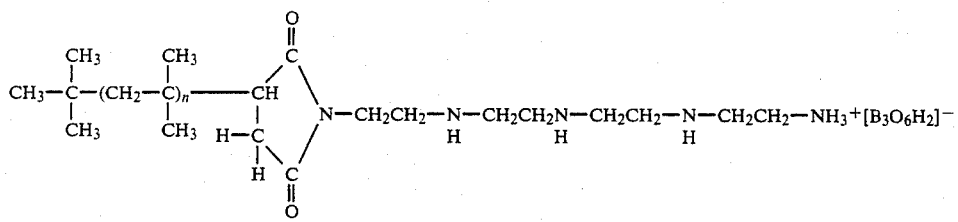

Surfactant A₂

The polyamine identified as Surfactant A₂ is available as Paranox 106 from Exxon Chemical Company.

In addition, the composition may have included in it either in the oil phase or in the water-polymer phase, preferably the oil phase, a fibrous material such as fiberglass, asbestos, wood fiber, cellulose, or shreaded paper, cottonseed hulls, sugar cane bagasse, pencil shavings, peanut shells, which is substantially impervious to the action of the water-polymer phase and to the oil phase. These added materials serve the purpose of imparting increased mechanical strength and rigidity to the paste which forms upon interaction of the clay and the water-polymer phase.

The shear thickening fluid may also have added to it materials such as barite, hematite, galena, ilmenite, etc., which are commonly used for increasing the density of drilling fluids. These weighting agents are not water-swellable and will not participate in the shear-thickening effect of the instant invention but would be added if higher density formulations were particularly desired. If used, the weighting agents will absorb some of the surfactant, especially if the agent is finely powdered. Consequently, an additional volume of surfactant would have to be added to make up for this absorbed portion, so as to maintain the stability of the composition.

For the purposes of the specification, a paste is defined as being capable of sealing a lost circulation zone or a blowout if it develops a shear strength of at least 2000 pounds per 100 square feet.

The mixtures of the instant invention have been found to function quite well at temperatures of 300° F. or higher as would be actually encountered in well control situations.

With the proviso that the clay and the aqueous phase are never mixed together before their introduction into the oil phase, the components of the instant invention may be mixed in any order. In general, the oil, surfactant and clay are mixed together employing any convenient mixing apparatus. The oil-surfactant phase may have the aqueous polymer phase suspended in it first. This emulsion can be kept "on hand" in its premixed form. To this then is added the clay, when needed to control a blowout or seal a thief zone.

Preferably, the oil and surfactant are mixed together first and then the clay is added. This results in the formation of a granular clay in oil-surfactant emulsion. Next a water-polymer solution is added to this clay/oil/surfactant mixture. The resulting fluid material will have a continuous oil-surfactant phase.

It has been determined that the use of the water soluble polymer, such as polyacrylamide serves two beneficial functions. First, it improves the stability of the initial shear-thickening mixture by reducing the tendency of the mixture to thicken prematurely. Second, it gives a higher strength paste after high shear mixing. It has been determined that the hydrolysis of the polyacrylamide has a direct effect on the behavior of the material mixtures. Unhydrolyzed polyacrylamide results in a material which has a greater paste strength after high shear but has shorter low shear thickening time. Hydrolyzed polymer, on the other hand, gives the material a greater degree of stability but reduces the ultimate strength of the paste. Degree of hydrolysis may range, therefore, from 0% to 50%, preferably 0 to 15%, more preferably 1 to 7% or less. It has been determined that, within the above constraints, low shear thickening time (i.e., stability) is roughly independent of polymer concentration within the concentration ranges previously recited, while paste strength tends to increase with increased polymer concentrations.

In the practice of this invention, it is necessary to choose a specific formulation, from the ranges given above, that will perform well in the particular situation at hand. Examples of uncontrolled variables which will influence the selection of a formulation are:

1. The depth in a wellbore at which the treatment is to be applied.
2. The temperature downhole where the treatment will be applied.
3. The type of mixing and pumping equipment which will be used to prepare the material and inject it into the wellbore.
4. The type of unwanted flow or flow channel to be blocked.

Example 1 below contains a number of different specific formulations for shear-thickening fluid and shows the relationship between composition and performance.

EXAMPLE 1

The following example illustrates the practice of the instant invention on a laboratory scale. The many different formulations tested in this example will clarify the relationship between composition and performance.

The components used in the formulations of this example are specifically identified as follows:

Oil—S-100N paraffinic oil available from Exxon Company, U.S.A.

Surfactant—Surfactant A₂—available as Paranox 106 surfactant available from Exxon Chemical Co., U.S.A.

Clay—Bentonite GPG 30, available from Milchem Inc. (Mesh Size 20–70)

Polymer—P-250 polyacrylamide available from American Cyanamide Co. (Degree of Hydrolysis 1%)

All samples of shear-thickening fluid in this example were prepared according to the following general procedure.

(1) A known weight of surfactant was dissolved in a known weight of oil.
(2) A known weight of granular bentonite was mixed with the oil-surfactant solution resulting in a slurry of clay in oil and surfactant.

(3) Polyacrylamide was dissolved in water to give a solution of the desired strength.

(4) The aqueous solution of polyacrylamide was added to the clay slurry with mixing resulting in the suspension of discrete droplets of aqueous polymer solution in the oil-surfactant phase to give an oil continuous phase system.

In order to more accurately identify composites which will be useful under typical field conditions, a set of laboratory criteria was established to simulate the performance needed in the field. To this end, it was determined that for a composite to be useful, it must be pumpable, i.e., resistant to low shear forces for at least 5 minutes. It is also necessary that once mixed, sheared, and thickened, the composite must have a shear strength of at least 2000 pounds per 100 ft. The limits used to describe the operable ranges of the various components used in the composite were chosen so as to result in a composite satisfying these criteria.

Shear strength of the fluid was measured by noting the distance a hollow, open-ended cylinder (3.5 inches long, 1.4 inches in diameter, and 0.01 inches wall thickness) would sink into the fluid under the force of various weights. Shear strength was then calculated from the following equation:

$$\text{Shear Strength in lb/100 ft.}^2 = \frac{\text{Total Weight in Grams} \times 3.6}{\text{Penetration Distance in Inches}}$$

Standard formulations of granular bentonite well control fluid were prepared and mixed in a jacketed, low-shear mixing cell with an inside diameter of 2.9 inches and an inside height of 4.3 inches and a single egg beater impeller with an overall blade width of 1.8 inches and blade height of 2.7 inches. The jacket temperature of the cell was maintained at 95° C. (203° F.) with circulating hot water and the impeller was maintained at 500 RPM with a constant speed motor. The cell was tightly covered during mixing in order to prevent loss of water by evaporation from the fluid. The formulations were mixed for varying periods of time and then forced through a ¼" nozzle with a differential pressure of 1500 psi. Shear strengths of the fluid before and after passage through the high-shear nozzle were measured and plotted as a function of low-shear mixing time. The effect of oil phase surfactant concentration on the results was determined by carrying out duplicate sets of experiments at high and low oil phase surfactant concentrations.

Figure 2:
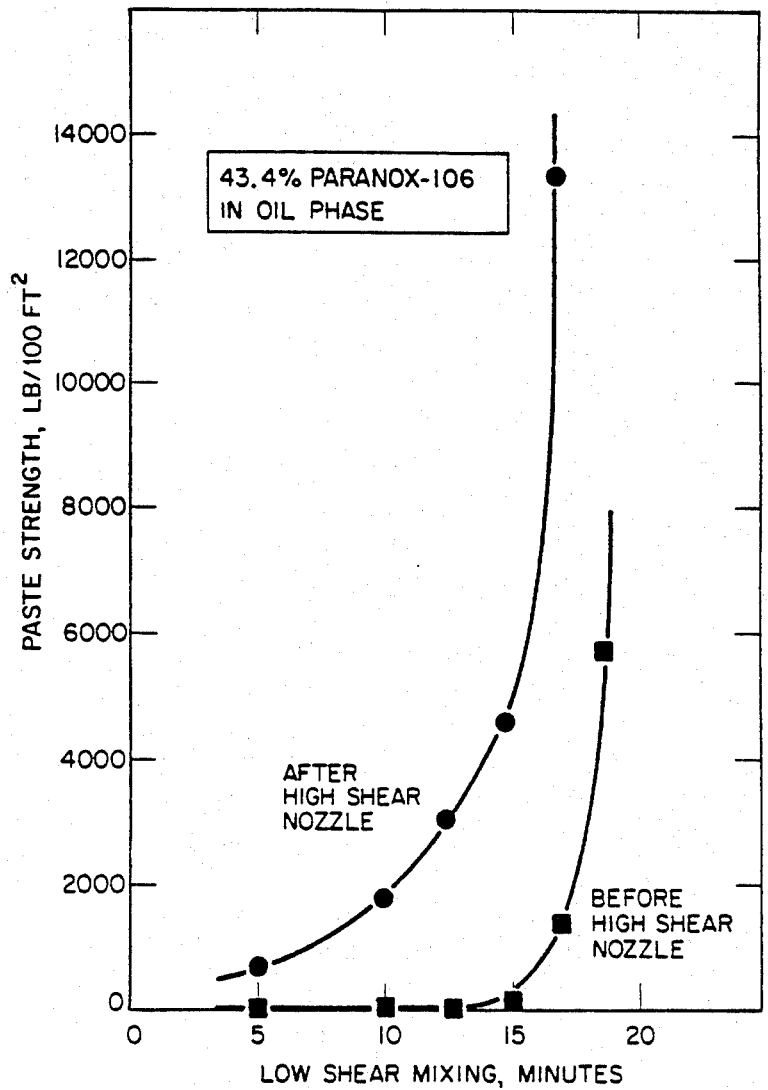
FIG. 2 is a graph of paste strength of a granular bentonite well control fluid which contains a 43.4% Paranox oil phase, as a function of low shear mixing time.

Plots of shear strength before and after high shear as a function of low-shear mixing time at high and low levels of oil phase surfactant concentration are given in FIGS. 1 and 2. In general, shear strength prior to high shear increases slowly with low-shear mixing until a point at which shear strength rises quite rapidly with additional low-shear mixing. This point is called the low-shear thickening time.

After high shear, but before the low shear thickening point, the shear strengths of granular bentonite shear thickening fluids increase to intermediate values after short periods of low shear mixing (see FIGS. 1 and 2). Oil phase surfactant concentration has a pronounced effect on this data. The lower level of surfactant, 21.7% Paranox 106 in S100N, gives higher shear strengths after shorter periods of low-shear mixing.

These experiments were chosen to closely resemble field conditions during the use of a shear thickening fluid. The period of time during which the fluid can be mixed under low shear before the thickening point reflects the "low shear stability" of the fluid. The ability of the fluid to form a high-strength paste following one pass through the high shear nozzle after various time periods of low shear mixing reflects the "high shear sensitivity" of the fluid. The optimum well control fluid formulation will possess both maximum low shear stability and maximum high shear sensitivity simultaneously. On this basis the lower oil phase surfactant concentration used in these experiments is the preferred concentration because it yields substantially greater high shear sensitivity with little reduction in low shear stability.

Figure 3:
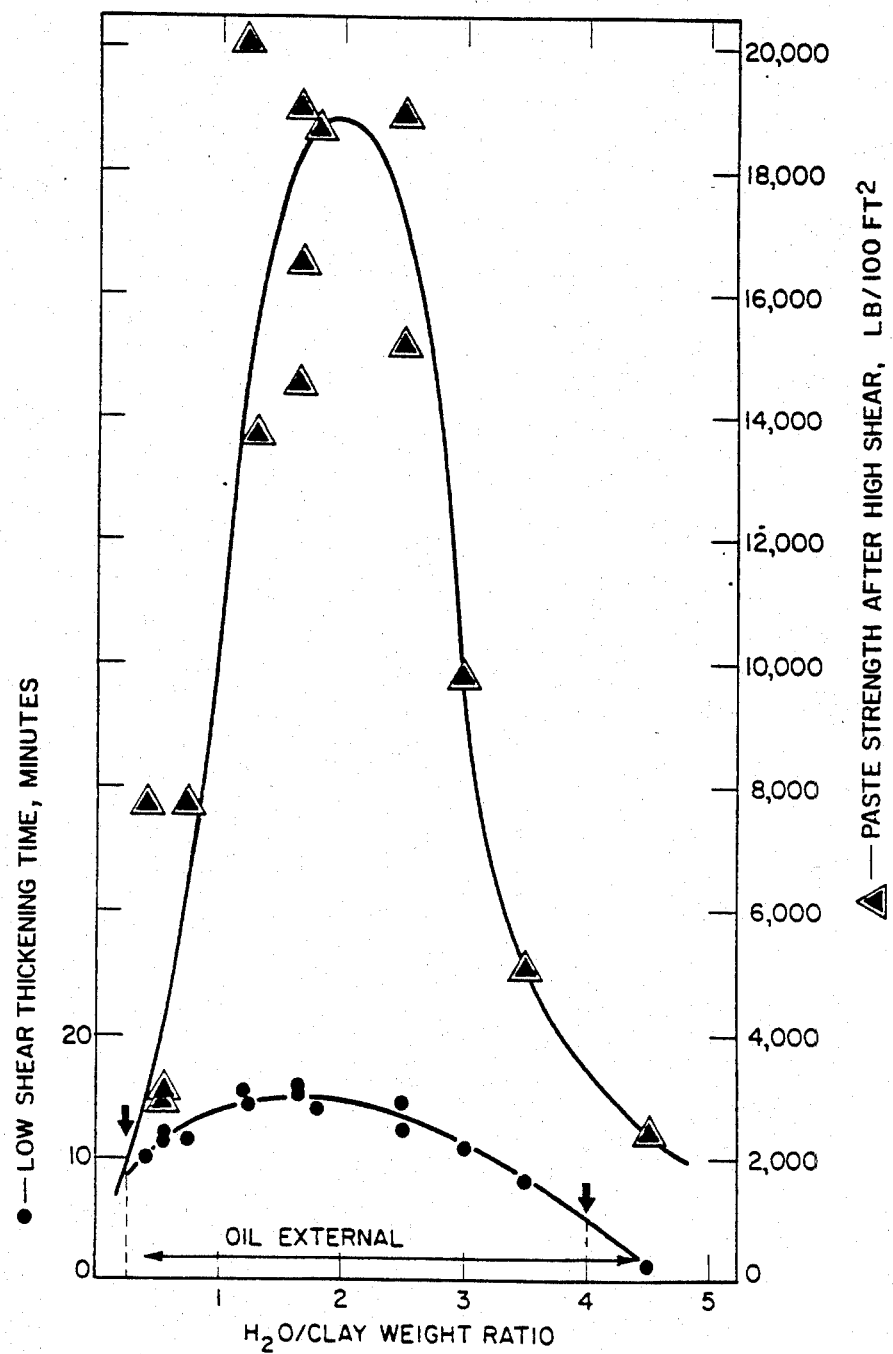
FIG. 3 correlates low shear thickening time and paste strength, after high shear, of a granular bentonite well control fluid, as a function of H₂O/clay weight ratio.
Figure 4:
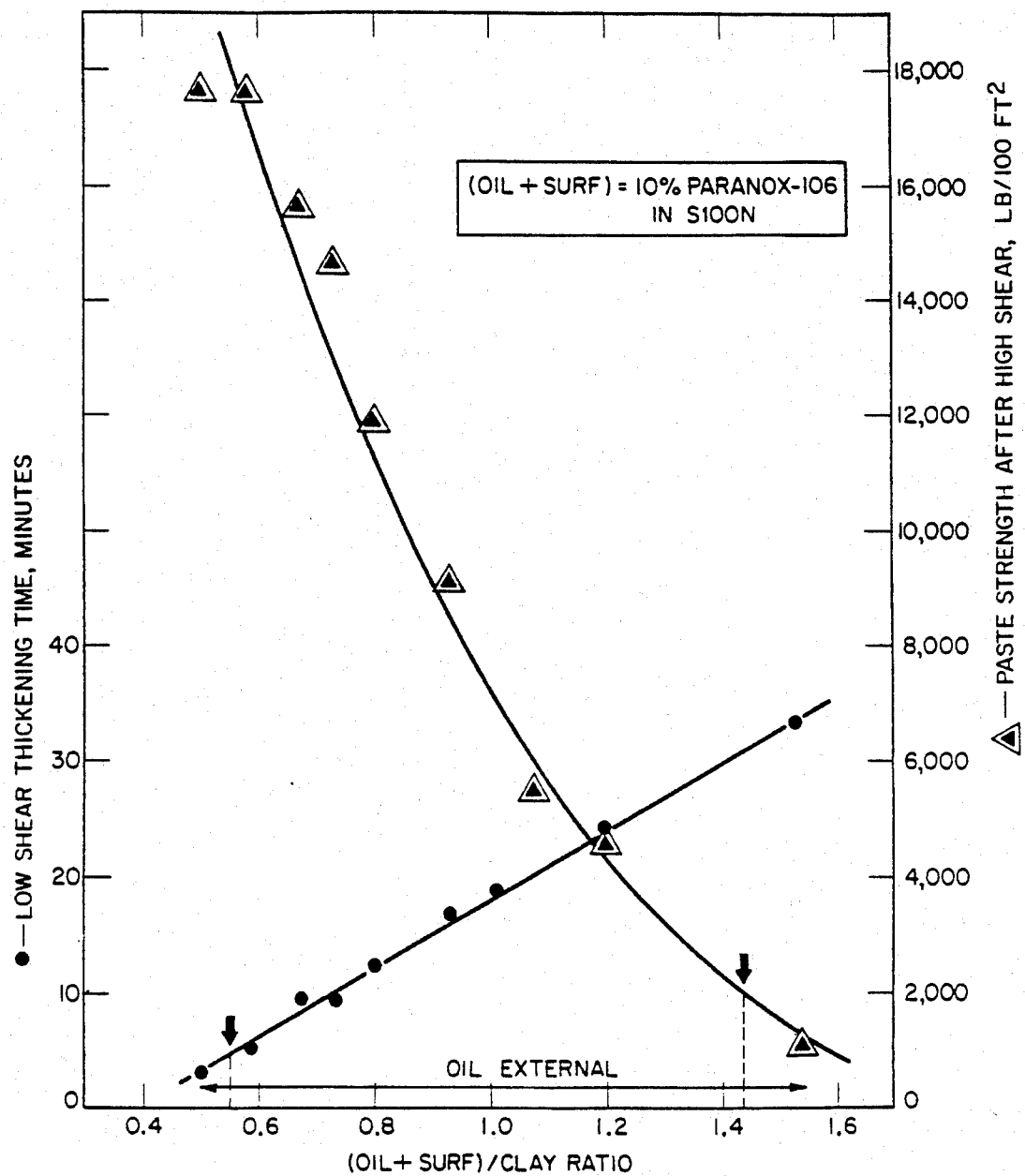
FIG. 4 correlates low shear thickening time and paste strength, after high shear, of a granular bentonite well control fluid, as a function of (oil and surfactant)/clay weight ratio.
Figure 5:
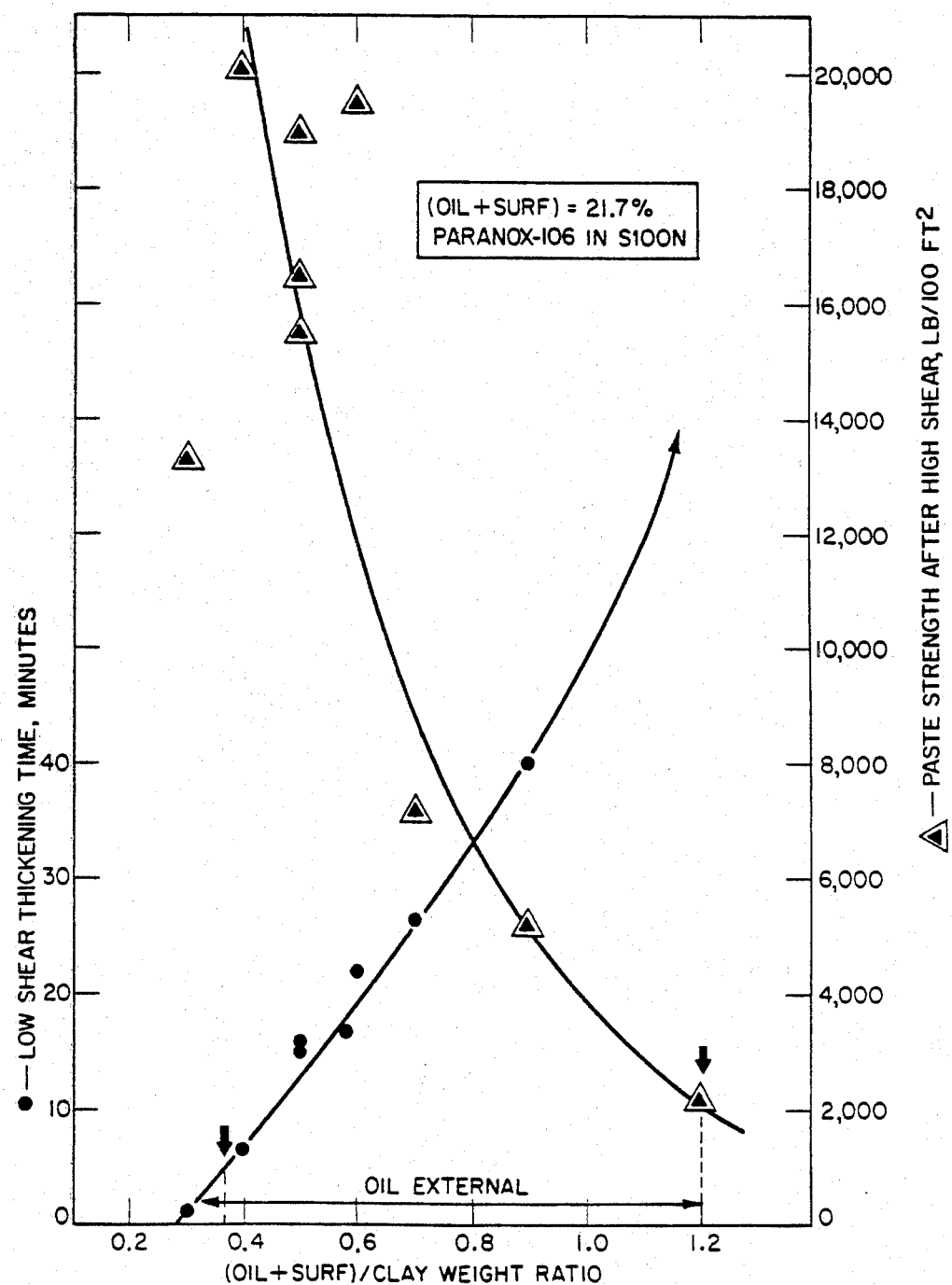
FIG. 5 correlates low shear thickening time and paste strength, after high shear, of a granular bentonite well control fluid, as a function of (oil and surfactant)/clay weight ratio.
Figure 6:
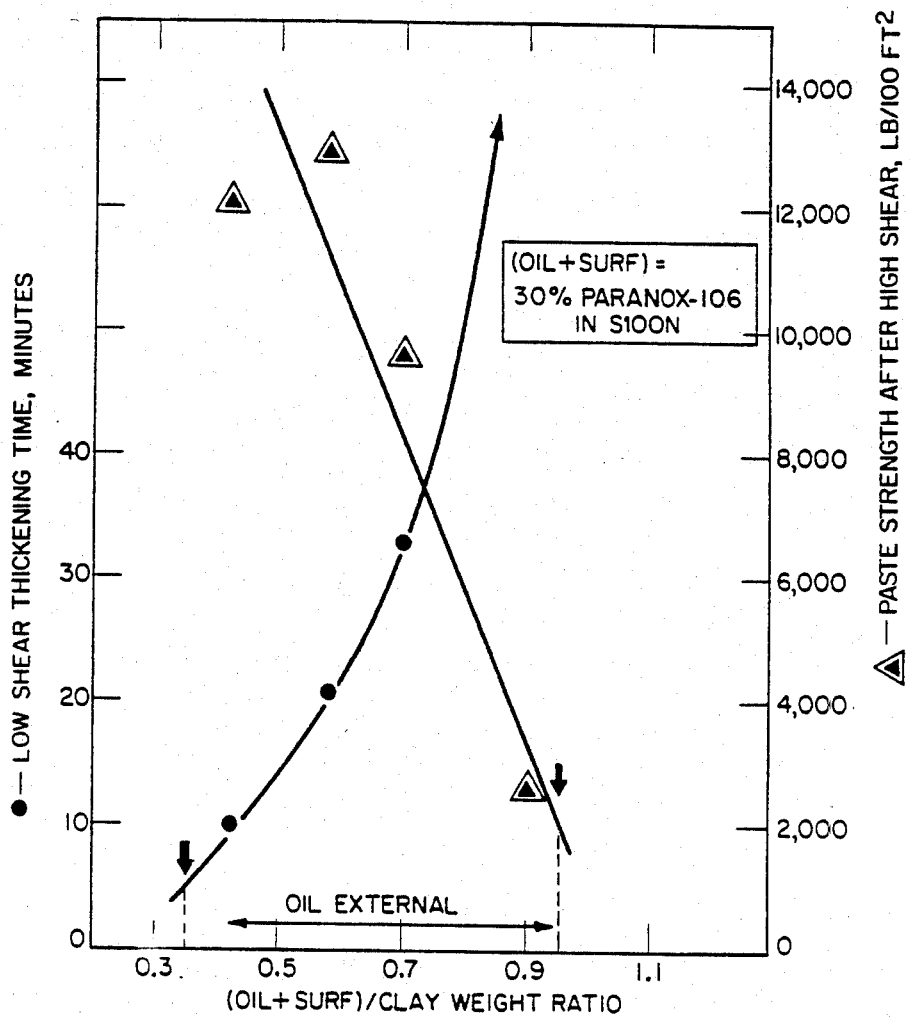
FIG. 6 correlates low shear thickening time and paste strength, after high shear, of a ganular bentonite well control fluid, as a function of (oil and surfactant)/clay weight ratio.
Figure 7:
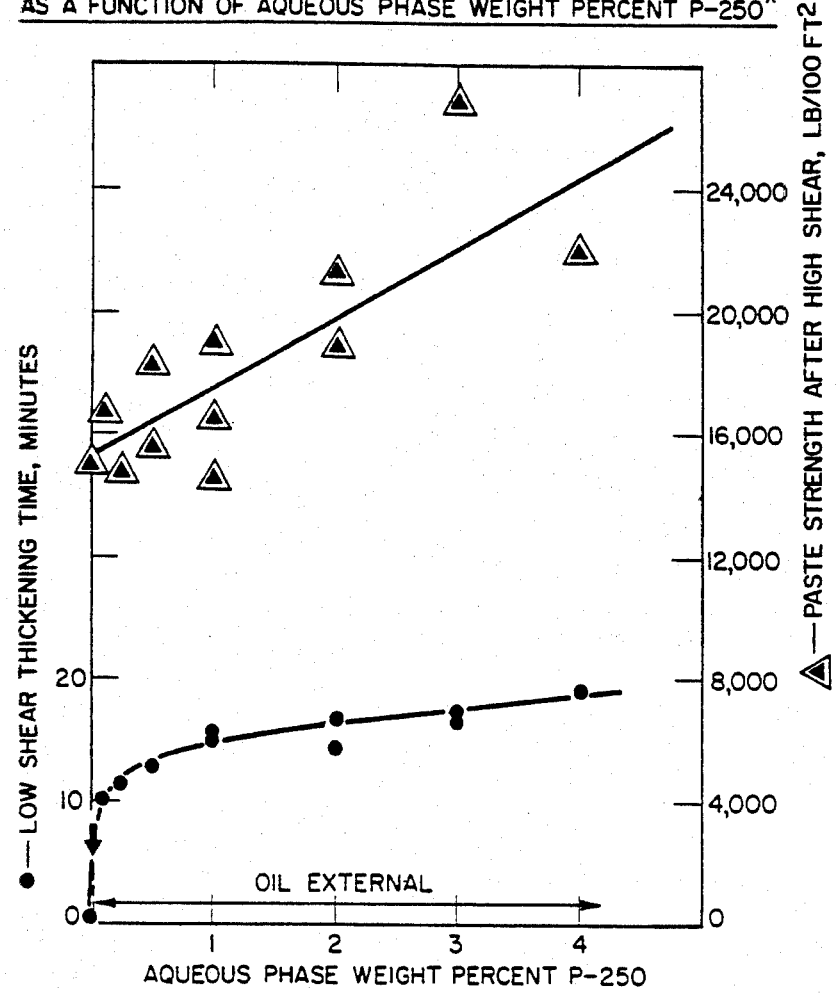
FIG. 7 correlates low shear thickening times and paste strength, after high shear, of a granular bentonite well control fluid, as a function of aqueous phase weight percent "P250" polymer.

The low-shear thickening time of granular bentonite shear-thickening fluid was relatively insensitive to the $H_2O$/clay weight ratio while the paste strength after high shear exhibited a pronounced optimum in the range of a ⅓ $H_2O$/clay weight ratio (FIG. 3). See also Table I. In contrast to this, low-shear thickening time increased linearly with (Oil+Surfactant)/Clay weight ratio, and paste strength after high shear decreased at nearly the same rate (FIGS. 4, 5 and 6). See also Tables II, III and IV. Aqueous phase weight percent of P-250 had relatively little effect on the low-shear thickening time of granular bentonite well control fluid as long as it was higher than a minimum value of about 0.5% (FIG. 7). See also Table V. Paste strength of granular bentonite shear-thickening fluid after high shear increased linearly with aqueous phase weight percent P-250. Table VI presents a compilation of the data presented in the foregoing figures and tables.

EXAMPLE 2

The following example illustrates the practice of the instant invention to create a plug in an actual wellbore. In this example the wellbore is plugged in the absence of any preexisting fluid flow.

The wellbore used in this example had been drilled with a 7⅞" diameter rock bit to a total depth of 2600 ft. The formations drilled were interbedded sands and shales; there were no significant drilling problems. The well had 8⅝" surface casing set at 1718 ft. The wellbore was filled with 10.5 ppg water-base drilling mud.

The shear-thickening fluid used in this example contained:

945 lb S-100N Oil (Exxon USA)
105 lb Paranox 106 (Surfactant $A_2$ from Exxon Chemical Company)
1800 lb KWK Granular Bentonite (American Colloid Company)
30 lb P-250 Polyacrylamide (American Cyanamide)
8.6 bbl Fresh Water These ingredients were mixed in a Halliburton ribbon blender which had two 50 barrel compartments. The mixing steps were:

(1) Dissolve the polyacrylamide in the water in one compartment of the blender.
(2) Mix the oil and surfactant in the other compartment.
(3) Add the clay to the oil surfactant and continue mixing.
(4) Transfer the polymer solution into the compartment with the clay slurry and mix gently to form the shear-thickening emulsion.

The drill string used in this example was 2⅞" EUE tubing with a 7⅞" rock bit on bottom. The bit was placed at 2568 ft. depth. The bit contained three 9/32" nozzles.

The shear-thickening material was pumped into the well with a Halliburton cementing truck. Steps in the pumping operation were:
(1) Rig up and circulate well with Halliburton
(2) Pump 2 bbl water spacer
(3) Pump 11 bbl shear-thickening fluid at one bbl/min.
(4) Pump 2 bbl water spacer
(5) Pump 13 bbl mud at 6 bbl/min.
(6) Stop pumps At this point the last of the shear-thickening material had just exited the bottom of the drill string through the bit. Passage through the bit nozzles had thickened the material into a stiff paste which had been forced up around the bottom of the drill string. Based on the volume pumped, 200 ft. of annulus was filled with paste. The pump pressure during displacement of the shear-thickening material (Step 6, above) started at 2000 psi and reached 2900 psi even though the rate was reduced to 5 bbl/min. at the end of the displacement.

The fact that a plug had been placed in the annulus was shown by measuring the drag on the pipe and by trying to move the plug by pumping under it at a low rate. The pipe drag was 30,000 lbs. The plug could not be moved by pumping down the drill string. At 900 psi surface pressure the formation broke down.

EXAMPLE 3

The following example illustrates the practice of the instant invention to stop a pre-existing gas flow. This test was not performed in an actual well but rather in a simulated wellbore.

The simulated wellbore in this example consisted of 172 ft. of 4" ID pipe. This pipe was open at one end and had multiple connections at the other end for introduction of gas and shear-thickening paste and for measuring the simulated bottom-hole pressure. The gas used in this example was air. This air was supplied from a 105 psig reservoir and passed through a flow meter and a throttling valve before entering the 4" pipe.

The shear-thickening material used in this example was prepared with the same formulation used in Example 2 above. The mixing steps were similar except that a truck-mounted concrete mixer was used instead of a Halliburton ribbon blender to prepare the final emulsion. About 1000 gallons of shear-thickening emulsion were prepared. This emulsion was pumped into the 4" pipe by a high-pressure constant-rate pump. Before entering the 4" pipe, the emulsion was sheared through a valve which was adjusted to have a 1200–1500 psi pressure drop at the flow rate being used.

In this example, the air throttling valve was first opened and adjusted to give an air flow rate of 197 Mscf/d. After this flow was established in the 4" pipe, the shear-thickening -emulsion pump was started and the shear valve adjusted to give 1200–1500 psi pressure drop at the valve. The emulsion pump rate was 100 gpm. In less than a minute, the shear-thickened paste had plugged the 4" pipe and stopped the air flow. The pressure in the injection end of the 4" pipe reached several hundred psi. The air flow did not resume even though the injection of paste was stoppeld. Subsequent testing showed that the paste plug in the 4" pipe would withstand pressure gradients of 10 psi/ft. without moving.

TABLE I
LOW SHEAR THICKENING TIMES AND PASTE STRENGTHS AFTER HIGH SHEAR FOR GRANULAR BENTONITE SHEAR THICKENING FLUID AS A FUNCTION OF WATER/CLAY WEIGHT RATIO*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | Water/ Clay Weight Ratio | Low Shear Thickening Time (Minutes) | Paste Strength After High Shear (lb/100 ft$^2$) |
|---|---|---|---|---|---|---|---|---|
| 273 | 16.3 | 58.7 | 150 | 2.5 | 60 | 0.40 | 10 | 7,700 |
| 262 | 8.1 | 29.4 | 75 | 1.25 | 41 | 0.55 | 11.3 | 2,900 |
| 265 | 12.5 | 45.0 | 115 | 1.95 | 63 | 0.55 | 12 | 3,100 |
| 405 | 8.1 | 29.4 | 75 | 1.25 | 56 | 0.75 | 11.5 | 7,700 |
| 230 | 8.1 | 29.4 | 75 | 1.25 | 92 | 1.20 | 15.5 | 20,100 |
| 402 | 8.1 | 29.4 | 75 | 1.25 | 94 | 1.25 | 14.2 | 13,700 |
| 186 | 8.1 | 29.4 | 75 | 1.25 | 124 | 1.65 | 15.8 | 14,500 |
| 219 | 8.1 | 29.4 | 75 | 1.25 | 124 | 1.65 | 15.0 | 19,000 |
| 285 | 8.1 | 29.4 | 75 | 1.25 | 124 | 1.65 | 15.2 | 16,500 |
| 404 | 8.1 | 29.4 | 75 | 1.25 | 135 | 1.80 | 13.9 | 18,700 |
| 223 | 8.1 | 29.4 | 75 | 1.25 | 186 | 2.5 | 14.5 | 18,900 |
| 403 | 8.1 | 29.4 | 75 | 1.25 | 187 | 2.5 | 12.2 | 15,200 |
| 267 | 8.1 | 29.4 | 75 | 1.25 | 224 | 3.0 | 10.8 | 9,800 |
| 260 | 8.1 | 29.4 | 75 | 1.25 | 262 | 3.5 | 8.2 | 5,100 |
| 261 | 8.1 | 29.4 | 75 | 1.25 | 337 | 4.5 | 1.4 | 2,400 |

*Fixed surfactant/clay (0.11), oil/clay (0.39), and polymer/clay (0.0167) weight ratios; data plotted in FIG. 3.

TABLE II
LOW SHEAR THICKENING TIMES AND PASTE STRENGTHS AFTER HIGH SHEAR FOR GRANULAR BENTONITE SHEAR THICKENING FLUID AS A FUNCTION OF (OIL + SURF)/CLAY WEIGHT RATIO*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | (Oil + Surf)/ Clay Weight Ratio | Low Shear Thickening Time (Minutes) | Paste Strength After High Shear (lb/100 ft$^2$) |
|---|---|---|---|---|---|---|---|---|
| 446 | 3.75 | 33.8 | 75 | 1.25 | 124 | 0.50 | 3.1 | 17,700 |
| 447 | 4.35 | 39.4 | 75 | 1.25 | 124 | 0.58 | 5.2 | 17,700 |

TABLE II-continued
LOW SHEAR THICKENING TIMES AND PASTE STRENGTHS AFTER HIGH SHEAR FOR GRANULAR BENTONITE SHEAR THICKENING FLUID AS A FUNCTION OF (OIL + SURF)/CLAY WEIGHT RATIO*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | (Oil + Surf)/ Clay Weight Ratio | Low Shear Thickening Time (Minutes) | Paste Strength After High Shear (lb/100 ft$^2$) |
|---|---|---|---|---|---|---|---|---|
| 448 | 5.03 | 45.2 | 75 | 1.25 | 124 | 0.67 | 9.3 | 15,700 |
| 449 | 5.48 | 49.3 | 75 | 1.25 | 124 | 0.73 | 9.3 | 14,700 |
| 450 | 6.00 | 54.0 | 75 | 1.25 | 124 | 0.80 | 12.2 | 11,900 |
| 451 | 6.98 | 62.8 | 75 | 1.25 | 124 | 0.93 | 16.7 | 9,100 |
| 452 | 7.58 | 68.2 | 75 | 1.25 | 124 | 1.01 | 18.7 | 5,400 |
| 453 | 9.00 | 81.0 | 75 | 1.25 | 124 | 1.20 | 24.0 | 4,500 |
| 454 | 11.98 | 103.3 | 75 | 1.25 | 124 | 1.53 | 33.3 | 1,100 |

*(Oil + Surf) = 10% Paranox 106 in S100N; fixed H$_2$O/Clay (1.65) and polymer/clay (0.0167) weight ratios; Data plotted in FIG. 4

TABLE III
LOW SHEAR THICKENING TIMES AND PASTE STRENGTHS AFTER HIGH SHEAR FOR GRANULAR BENTONITE SHEAR THICKENING FLUID AS A FUNCTION OF (OIL + SURF)/CLAY WEIGHT RATIO*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | (Oil + Surf)/ Clay Weight Ratio | Low Shear Thickening Time (Minutes) | Paste Strength After High Shear (lb/100 ft$^2$) |
|---|---|---|---|---|---|---|---|---|
| 272 | 4.9 | 12.6 | 75 | 1.25 | 124 | 0.30 | 1.1 | 13,300 |
| 406 | 6.5 | 23.5 | 75 | 1.25 | 124 | 0.40 | 6.5 | 20,100 |
| 186 | 8.1 | 29.4 | 75 | 1.25 | 124 | 0.50 | 15.8 | 14,500 |
| 219 | 8.1 | 29.4 | 75 | 1.25 | 124 | 0.50 | 15.0 | 19,000 |
| 285 | 8.1 | 29.4 | 75 | 1.25 | 124 | 0.50 | 15.2 | 16,500 |
| 254 | 9.5 | 34.3 | 75 | 1.25 | 124 | 0.58 | 16.7 | — |
| 407 | 9.8 | 35.2 | 75 | 1.25 | 124 | 0.60 | 22.0 | 19,500 |
| 270 | 11.4 | 41.1 | 75 | 1.25 | 124 | 0.70 | 26.5 | 7,200 |
| 271 | 14.6 | 52.9 | 75 | 1.25 | 124 | 0.90 | 40.0 | 5,200 |
| 90 | 19.5 | 70.5 | 75 | 1.25 | 124 | 1.20 | >97.5 | 2,200 |

*(Oil + Surf) = 21.7% Paranox 106 in S100N; fixed H$_2$O/Clay (1.65) and polymer/clay (0.0167) weight ratios; Data plotted in FIG. 5.

TABLE IV
LOW SHEAR THICKENING TIMES AND PASTE STRENGTHS AFTER HIGH SHEAR FOR GRANULAR BENTONITE SHEAR THICKENING FLUID AS A FUNCTION OF (OIL + SURF)/CLAY WEIGHT RATIO*

| Sample No. | Surfactant ECA-5025 (Grams) | Oil S100N (Grams) | Clay Granular Bentonite (Grams) | Polymer Cyanamer P-250 (Grams) | Water Fresh[a] (Grams) | (Oil + Surf)/ Clay Weight Ratio | Low Shear Thickening Time (Minutes) | Paste Strength After High Shear (lb/100 ft$^2$) |
|---|---|---|---|---|---|---|---|---|
| 346 | 9.4 | 21.9 | 75 | 1.25 | 124 | 0.42 | 10 | 12,100 |
| 344 | 13.1 | 30.6 | 75 | 1.25 | 124 | 0.58 | 20.9 | 12,900 |
| 345 | 15.8 | 36.7 | 75 | 1.25 | 124 | 0.70 | 33 | 9,600 |
| 408 | 20.3 | 47.2 | 75 | 1.25 | 124 (Distilled) | 0.90 | long | 2,600 |

*(Oil + Surf) = 30.0% Paranox 106 in S100N; fixed H$_2$O/Clay (1.65) and polymer/clay (0.0167) weight ratios; Data plotted in FIG. 6.
[a]Untreated well water, also used in the large scale test of Example 2.

TABLE V
LOW SHEAR THICKENING TIMES AND PASTE STRENGTHS AFTER HIGH SHEAR FOR GRANULAR BENTONITE SHEAR THICKENING FLUID AS A FUNCTION OF AQUEOUS PHASE WEIGHT % P-250*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | Aqueous Phase Weight % P-250 | Low Shear Thickening Time (Minutes) | Paste Strength After High Shear (lb/100 ft$^2$) |
|---|---|---|---|---|---|---|---|---|
| 276 | 8.1 | 29.4 | 75 | 0 | 125 | 0 | 1 | 15,000 |
| 395 | 8.1 | 29.4 | 75 | 0.125 | 125 | 0.10 | 10.2 | 16,700 |
| 394 | 8.1 | 29.4 | 75 | 0.132 | 125 | 0.25 | 11.3 | 14,700 |
| 393 | 8.1 | 29.4 | 75 | 0.625 | 124 | 0.50 | 13 | 15,500 |
| 277 | 8.1 | 29.4 | 75 | 0.625 | 124 | 0.50 | 12.9 | 18,300 |
| 186 | 8.1 | 29.4 | 75 | 1.25 | 124 | 1.0 | 15.8 | 14,500 |
| 219 | 8.1 | 29.4 | 75 | 1.25 | 124 | 1.0 | 15.0 | 19,000 |
| 285 | 8.1 | 29.4 | 75 | 1.25 | 124 | 1.0 | 15.2 | 16,500 |
| 142 | 8.1 | 29.4 | 75 | 1.25 | 123 | 2.0 | 14.3 | 21,300 |

TABLE V-continued
LOW SHEAR THICKENING TIMES AND PASTE STRENGTHS AFTER HIGH SHEAR FOR GRANULAR BENTONITE SHEAR THICKENING FLUID AS A FUNCTION OF AQUEOUS PHASE WEIGHT % P-250*

| Sample No. | Surfactant Paranox 106 (Grams) | Oil S100N (Grams) | Clay Granular Bentonite (Grams) | Polymer Cyanamer P-250 (Grams) | Water Distilled Water (Grams) | Aqueous Phase Weight % P-250 | Low Shear Thickening Time (Minutes) | Paste Strength After High Shear (lb/100 ft$^2$) |
|---|---|---|---|---|---|---|---|---|
| 142 | 8.1 | 29.4 | 75 | 2.50 | 123 | 2.0 | 16.7 | 18,900 |
| 275 | 8.1 | 29.4 | 75 | 3.75 | 121 | 3.0 | 16.7 | 26,800 |
| 282 | 8.1 | 29.4 | 75 | 3.75 | 121 | 3.0 | 17.3 | — |
| 286 | 8.1 | 29.4 | 75 | 5.0 | 120 | 4.0 | 19.0 | 22,000 |

*Fixed H$_2$O/Clay (1.65), surfactant/clay (0.11), and oil/clay (0.39) weight ratios; data plotted in FIG. 7.

TABLE VI
COMPOSITION RANGES OF GRANULAR BENTONITE SHEAR THICKENING FLUID
(Compositions expressed in Parts by Weight)

| | FIG. 3 (pbw) | FIG. 4 (pbw) | FIG. 5 (pbw) | FIG. 6 (pbw) | FIG. 7 (pbw) | Overall Composition Ranges FIGS. 3 through 7 (Parts by Weight) |
|---|---|---|---|---|---|---|
| Granular Clay | 100 | 100 | 100 | 100 | 100 | 100 |
| Paranox 106 | 10.9 | 5.5–14 | 8.0–26 | 10.5–28 | 10.8 | 5.5–29 |
| S100N | 38.5 | 45–130 | 29–94 | 2–67 | 39.2 | 25–130 |
| P-250 | 1.66 | 1.6 | 1.67 | 1.67 | 0.1–6.7 | 0.1–6.7 |
| H$_2$O | 25–400 | 165 | 165 | 165 | 166.7–160 | 25–400 |

TABLE VII
COMPARISON OF GRANULAR BENTONITE TO POWDERED BENTONITE IN SHEAR THICKENING WELL CONTROL FLUID*

| Total Bentonite (grams) | Powdered Bentonite 200 Mesh Gel Time$^{(a)}$ (min.) | Powdered Bentonite 200 Mesh Gel Strength$^{(b)}$ (lb/100 ft$^2$) | Granular Bentonite 20–40 Mesh Gel Time$^{(a)}$ (grams) | Granular Bentonite 20–40 Mesh Gel Strength$^{(b)}$ (lb/100 ft$^2$) |
|---|---|---|---|---|
| 30 | 24 | 11,400 | 780 | 2,100 |
| 45 | 10 | 16,500 | 22 | 10,800 |
| 60 | 0 | — | 15 | 26,000 |

*Basic Formula: 30.5 g oil (32.5% Surfactant A$_2$ in S100N)
30–60 g Bentonite Clay
125 g 1% P-250 in Water
$^{(a)}$Gel time measured in jacketed low shear mixing cell, 500 RPM, 91° C.
$^{(b)}$Gel strength measured after hand kneading at zoom temperature.

This set of data show that it is possible to stabilize a greater weight of granular bentonite than powdered bentonite with a fixed amount of water, oil, surfactant, and polymer in the fluid mixture. At the highest clay loading, the granular bentonite fluid is able to withstand 15 minutes of low shear mixing at 500 RPM and 91° C., whereas the powdered bentonite fluid gels immediately. As a consequence of the higher clay loadings attainable with the granular bentonite fluid, it exhibits higher gel strengths than the powdered bentonite fluid.

Apart from higher gel strength, the initial phase continuity of granular bentonite well control fluid is unexpectedly different from that of powdered bentonite fluid. Following mixture of all the components in the standard manner, granular bentonite fluid is oil external whereas powdered bentonite fluid is water external.

Figure 8:
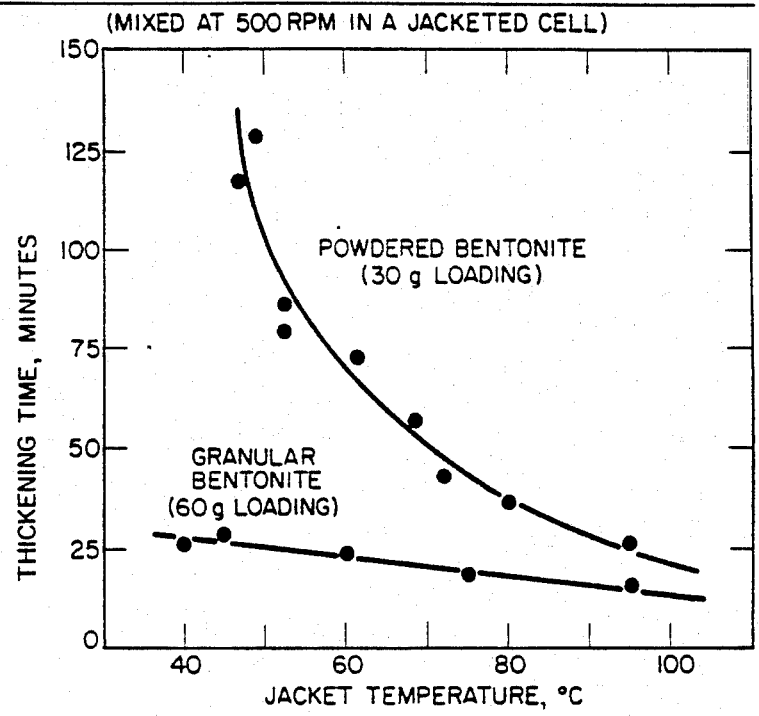
FIG. 8 is a graph of the thickening time of a powdered bentonite well control fluid and a granular bentonite well control fluid as a function of temperature.

The difference in phase continuity between the two fluids affects their response to changes in temperature and shear. Over the temperature range of 47° to 95° C., the gel time of powdered bentonite fluid decreases from 120 to 25 minutes, very nearly as the inverse square of the change in temperature. In contrast to this, the gel time of granular bentonite fluid over the same temperature range decreases as the inverse first power of the change in temperature. See FIG. 8. The fluids compared in that figure have the following compositions:

| | |
|---|---|
| Powdered bentonite formulation: | 30.5 g Oil (32.5% Surf. A$_2$ in S100N) |
| | 30.5 g Powdered bentonite |
| | 125.0 g 1% P-250 in water |
| Granular bentonite formulation: | 37.5 g Oil (21.7% Surf. A$_2$ in S100N) |
| | 75.0 g KWK Volclay (20–40 mesh bentonite) |
| | 125.0 g 1% P-250 in water |

Figure 9:
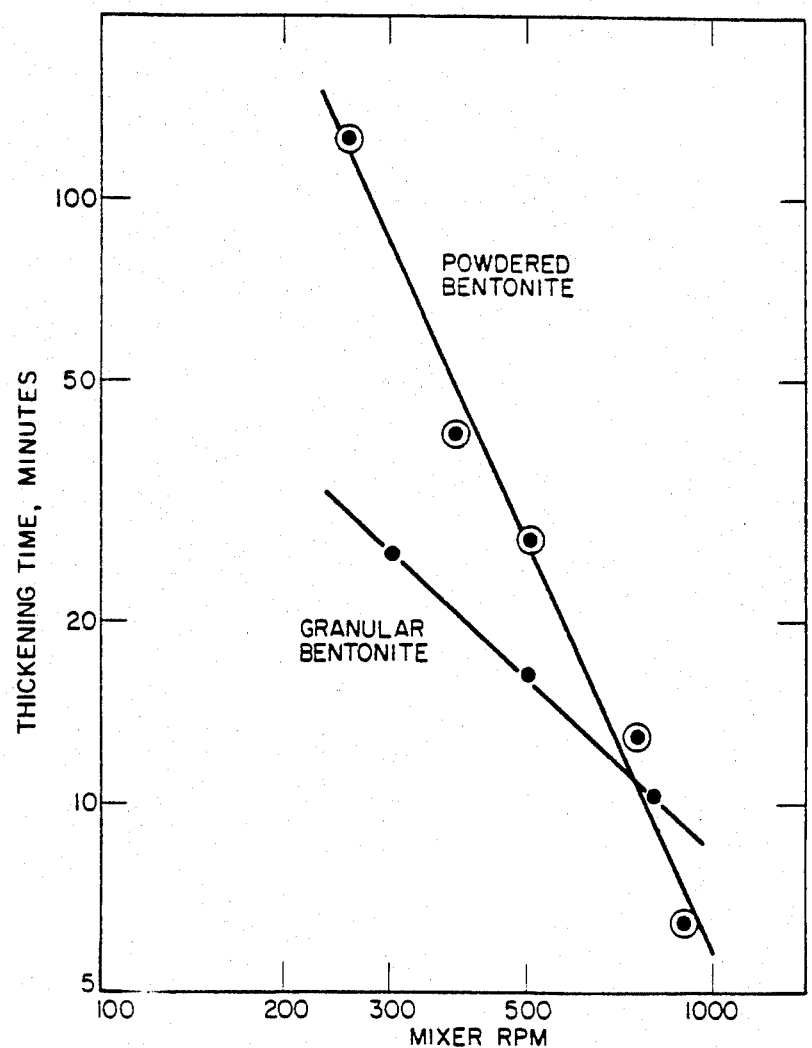
FIG. 9 is a graph of the thickening time of a powdered bentonite well control fluid and a granular bentonite well control fluid as a function of mixer rpm as an indication of shear sensitivity.

Similarly, the gel time of powdered bentonite fluid decreases as the inverse square of mixer RPM, whereas the gel time of granular bentonite fluid varies as the inverse first power of mixer RPM. See FIG. 9. The fluids compared in that figure have the following compositions:

| | |
|---|---|
| Powdered bentonite formulation: | 30.5 g Oil (32.5% Surf. A$_2$ in S100N) |
| | 30.5 g Powdered bentonite |
| | 125.0 g 1% P-250 in water |
| Granular bentonite formulation | 43.7 g Oil (21.7% Surf. A$_2$ in S100N) |
| | 75.0 g KWK Volclay (20–40 mesh bentonite) |
| | 125.0 g 1% P-250 in water |

In addition to its effect on response to temperature and shear, the initial phase continuity of well control fluid affects the relationship between composition and gel time. The most striking effect is seen in the relationship between H$_2$O/clay ratio and gel time, presented in FIG. 10. The fluids compared in that figure have the following compositions:

| | |
|---|---|
| Powdered bentonite formulation: | 22.3 g Oil (32% Surf. A$_2$ in S100N) |
| | 30.5 g Powdered bentonite |
| | 1.0 g P-250 |
| | 73.2–229.0 g Water |
| Granular bentonite formulation: | 37.5 g Oil (22% Surf. A$_2$ in S100N) |
| | 75.0 g KWK Volclay (20–40 mesh bentonite) |
| | 1.25 g P-250 |

-continued

| 30.0–337.0 g Water |

The gelled granular bentonite fluid also retains a significantly higher fraction of its gel strength when mixed with additional water than does the powered bentonite fluid.

TABLE VIII
GEL STRENGTH RETENTION IN THE PRESENCE OF ADDITIONAL WATER FOR POWDERED AND GRANULAR BENTONITE WELL CONTROL FLUIDS*

|  | Additional Water (Wt. %) | Gel Strength (lb/100 ft².) | Gel Strength Retained |
|---|---|---|---|
| Powdered Bentonite | 0 | 8,900 | 100% |
|  | 20 | 4,000 | 45% |
|  | 40 | 1,800 | 20% |
|  | 100 | 50 | 6% |
| Granular | 0 | 25,400 | 100% |
| Bentonite | 20 | 21,000 | 80% |
|  | 40 | 14,200 | 56% |
|  | 100 | 4,800 | 22% |

*Fluids mixed to 80% of gel time in jacketed cell at 500 RPM and 95° C., passed through high shear piston cell, mixed with additional water, and kneaded by hand until maximum strength attained.

| Powdered bentonite formula: | 30.5 g Oil 132.5% Surf. A₂ in S100N) |
|---|---|
|  | 30.5 g Powdered bentonite |
|  | 125.0 g 1% P-250 in water |
| Granular bentonite formula: | 37.5 g Oil (21.7% Surf. A₂ in S100N) |
|  | 75.0 g KWK Volclay (20–40 mesh bentonite) |
|  | 125.0 g 1% P-250 in water |

The influence of the clay mesh range on the low shear gel time of granular bentonite shear thickening fluids was determined. The fluids listed were formulated in the standard manner previously recited employing the following components in the concentrations indicated:
125.0 g 1% P-250 in water
37.5 g oil (21.7% Surf. A₂ in S100N)
75.0 g KWK-Volclay ground and sieved to the mesh ranges indicated in Table IX below The components were mixed in the jacketed sample cell at 500 RPM and 95° C. and exhibited a strong dependence on clay mesh size, as presented in Table IX:

TABLE IX

| Mesh Range | Low Shear Gel Time (min.) |
|---|---|
| <100 mesh | 1.7 |
| 80/100 | 3.7 |
| 60/80 | 4.6 |
| 40/60 | 7.0 |
| 20/40 | 13.0 |
| <20 | 14.3 |

Shear thickening fluids containing granular bentonite, powdered bentonite and mixtures of granular and powdered bentonite were prepared and examined for low shear gel time and high shear gel strength. The results are presented in Table X.

TABLE X

| | % GRANULAR BENTONITE IN WELL CONTROL FLUID* | | | | | |
|---|---|---|---|---|---|---|
| | 100% | | 67% | | 50% | |
| TOTAL GRAMS BENTONITE | GEL TIME$^a$ (min) | GEL STRENGTH$^b$ (lb) (100 ft²) | GEL TIME$^a$ (min) | GEL STRENGTH$^b$ (lb) (100 ft²) | GEL TIME$^a$ (min) | GEL STRENGTH$^b$ (lb) (100 ft²) |
| 30 | 780 | 2,100 | None | None | 17 | 7,100 |
| 45 | 22 | 10,800 | 8 | 15,900 | None | None |
| 60 | 15 | 26,000 | None | None | 4 | 26,000 |

| | 33% | | 0% | |
|---|---|---|---|---|
| TOTAL GRAMS BENTONITE | GEL TIME$^a$ (min) | GEL STRENGTH$^b$ (lb) (100 ft²) | GEL TIME$^a$ (min) | GEL STRENGTH$^b$ (lb) (100 ft²) |
| 30 | None | None | 24 | 11,400 |
| 45 | 5 | 20,300 | 10 | 16,500 |
| 60 | None | None | None | None |

*Basic formulation:
30.5 g oil (32.5% Surfactant A₂ in S100N)
30, 45 or 60 g Bentonite Clay, as indicated
125.0 g 1% P-250
$^a$Gel time measured in jacketed low shear mixing cell, 500 rpm, 91° C.
$^b$Gel strength measured after hand kneading at room temperature.

As can be seen, systems employing mixtures of granular bentonite and powdered bentonite are inferior to systems employing either alone, with respect to either low shear gel times or high shear gel strength. Further, a comparison of Tables VII and X shows that with equivalent clay loadings of 30 grams, a 100% granular composition yields a relatively low strength gel (2,100 lb/100 ft²) while a powdered composition yields a significantly higher strength gel (11,400 lb/100 ft²). Similarly, at a 60 g loading, 100% granular systems function in a remarkably superior manner while powdered systems cannot even be formulated since the systems set up almost instantly.

What is claimed is:

1. A well-control shear thickening composite comprising (1) water swellable clay granules capable of rapidly forming a high strength paste when brought into contact with water, (2) a hydrophobic phase comprising oil and a surfactant and (3) an aqueous phase comprising water and a water soluble polymer wherein the clay granules, present in sufficient quantity so as to form a paste having a strength of at least 2000 lb/100 ft², are suspended in the hydrophobic phase as discrete particles, and the aqueous phase is also suspended as discrete droplets in the hydrophobic phase, the hydrophobic continuous phase maintaining the water swellable clay granules and aqueous phase droplets separated during low shear pumping of the composite, the clay granules fragmenting during the application of high shear to the shear-thickening composite causing the aqueous phase to contact the fragmented clay granules to form said paste.

2. The composite of claim 1 wherein the water swellable clay granules are selected from the group consisting of granular montmorillonite clay and granular attapulgite clay with a particle size of between 10 to 60 mesh.

3. The composite of claim 1 wherein the oil comprises mineral oil, $C_6$ to $C_{1000}$ paraffinic oil, motor oil, substituted paraffinic oil wherein the substituents are selected from the group consisting of halogens, amines, sulfates, nitrates, carboxylates and hydroxyls.

4. The composite of claim 2 wherein the oil is a $C_6$ to $C_{200}$ liquid paraffin oil.

5. The composite of claim 1 wherein the water soluble polymer is polyacrylamide, polymethacrylamide, polystyrene sulfonate, polyvinyl toluene sulfonate, polyethyleneoxide, or polyvinyl alcohol.

6. The composite of claim 4 wherein the water soluble polymer is polyacrylamide.

7. The composite of claim 6 wherein the polyacrylamide is hydrolyzed to a degree ranging from 0 to 50%.

10. The composite of claim 9 wherein the polyalkenyl succinic anhydride is selected from the group consisting of polyisobutenyl succinic anhydride, polypropenyl succinic anhydride acid polybutenyl succinic anhydride.

11. The composite of claim 9 wherein the surfactant is represented by the general formula:

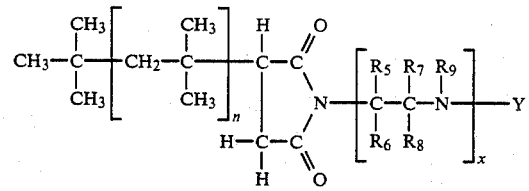

wherein n varies from 10 to 60, preferably 10 to 30, most preferably 15 to 17; x varies from 1 to 100, preferably 3 to 10; $R_5$, $R_6$, $R_7$, $R_8$, $R_9$ are hydrogen $C_1$ to $C_{20}$ aryl, $C_7$ to $C_{20}$ alkaryl radical and substituted derivative thereof, and Y is selected from the group consisting of hydrogen and oxygen substituted hydrocarbyl radicals having up to 10 carbons.

12. The composite of claim 11 wherein the surfactant is represented by the formula:

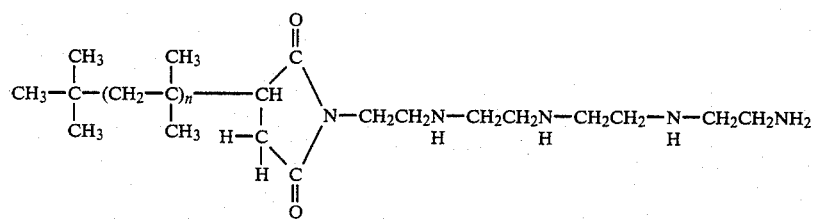

and

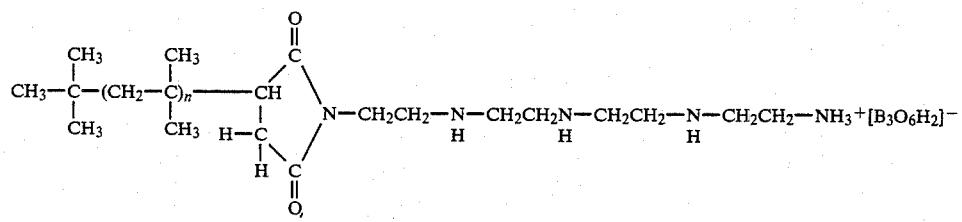

8. The composite of claims 1, 2, 3, 4, 5, 6 or 7 comprising 100 parts by weight (pbw) granular clay, 25 to 400 pbw water, 0.1 to 6.7 pbw water soluble polymer, 25 to 130 pbw oil, and 5.5 to 29 pbw surfactant.

9. The composite of claim 8 wherein the surfactant is the product obtained by the reaction of the polyamine:

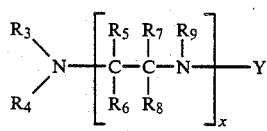

wherein $R_3$, $R_4$, $R_5$, $R_6$, $R_7$, $R_8$, $R_9$ and Y are selected from the group consisting of hydrogen, $C_1$ to $C_{20}$ alkyl, $C_6$ to $C_{20}$ aryl, $C_7$ to $C_{20}$ alkaryl radicals and substituted derivatives thereof and x is an integer of from 1 to 100 with polyalkenyl succinic anhydrides, reaction proceding at the $R_3$, $R_4$ substituted nitrogen.

13. The composite of claim 8 wherein the clay granules have a grain particle size of 10-40 mesh.

14. The composite of claim 8 wherein the clay granules have a grain particle size of 20-40 mesh.

15. A method for treating a well penetrating a subterranean formation to block off an unwanted flow path which comprises:

(a) forming a well control shear thickening composite comprising (1) water swellable clay granules capable of rapidly forming a high strength paste when brought into contact with water, (2) a hydrophobic phase comprising oil and a surfactant and (3) an aqueous phase comprising water and a water soluble polymer wherein the clay granules, present in sufficient quantity so as to form a paste having a strength of at least 2000 lb/100 ft$^2$, are suspended in the hydrophobic phase as discrete particles, and the aqueous phase is also suspended as discrete droplets in the hydrophobic phase, the hydrophobic continuous phase maintaining the water swellable clay granules and aqueous phase droplets separated during low shear pumping of the composite, the clay granules fragmenting during the application of high shear to the shear thickening composite causing the aqueous phase to contact the fragmented clay granules to form said paste;

(b) pumping said composite down said well; and (c) subjecting said composite to high shear mixing adjacent to said unwanted flow path sufficient to fragment said clay granules causing them to contact said aqueous phase, so that said composition thickens into said paste blocking off said unwanted flow path.

16. The method of claim 15 wherein the high shear mixing consists of passing the shear thickening fluid through the orifices of a drill bit or nozzle in the well.

17. The method of claim 15 wherein the shear thickening composite comprises 100 parts by weight (pbw) clay granules, 25 to 400 pbw water, 0.1 to 6.7 pbw water soluble polymer, 25 to 130 pbw oil and 5.5 to 29 pbw surfactant, said clay granules having a grain size ranging from 10–60 mesh.

18. The method of claim 17 wherein the clay granules are montmorillonite clay or attapulgite clay, the oil is mineral oil, $C_6$ to $C_{1000}$ paraffinic clay, motor oil and substituted paraffinic oil wherein the substituents are selected from the group consisting of halogens, amines, sulfates, nitrates, carboxylates and hydroxyls and the surfactant is the product obtained by the reaction of polyalkenyl succinic anhydrides with a polyamine of the general formula

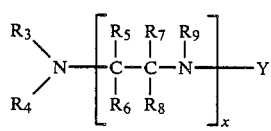

wherein $R_3$–$R_9$ and Y are chosen from the group consisting of hydrogen $C_1$ to $C_{20}$ alkyl, $C_6$ to $C_{20}$ aryl, $C_7$ to $C_{20}$ alkaryl radicals and substituted derivatives thereof, and x is an integer of from 1 to 100, reaction proceeding at the $R_3$, $R_4$ substituted nitrogen, and the water-soluble polymer is polyacrylamide, polymethacrylamide, polystyrene sulfonate, polyvinyl toluene sulfonate, polyethylene oxide or polyvinyl alcohol.

19. The method of claim 18 wherein the water-soluble polymer is polyacrylamide.

20. The method of claim 17 wherein the surfactant is represented by the general formula

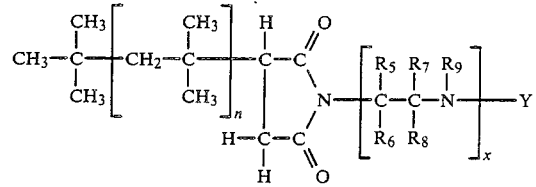

wherein n varies from 10 to 60, preferably 10 to 30, most preferably 15 to 17; x varies from 1 to 100, preferably 3 to 10; $R_5$, $R_6$, $R_7$, $R_8$, $R_9$ are hydrogen $C_1$ to $C_{20}$ alkyl, $C_6$ to $C_{20}$ aryl, $C_7$ to $C_{20}$ alkaryl radical and substituted derivative thereof, and Y is selected from the group consisting of hydrogen and oxygen substituted hydrocarbyl radicals having up to 10 carbons.

21. The method of claim 20 wherein the surfactant is of the formula:

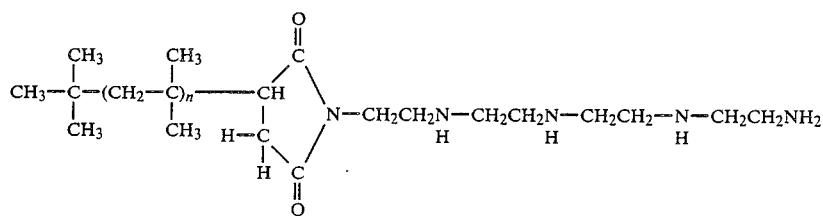

and

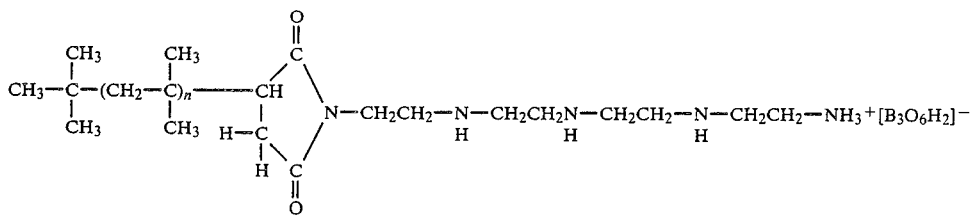

22. The method of claim 17 wherein the clay granules have a grain size range of 10–40 mesh.

23. The method of claim 17 wherein the clay granules have a grain size range of 20–40 mesh.

24. A shear thickening composite comprising (1) 100 parts by weight (pbw) water swellable clay granules capable of rapidly forming a high strength paste when brought into contact with water, (2) a hydrophobic phase comprising 25 to 130 pbw oil and 5.5 to 29 pbw surfactant and (3) an aqueous phase comprising 25 to 400 pbw water and 0.1 to 6.7 pbw water soluble polymer wherein the clay granules, present in sufficient quantity so as to form a paste having a strength of at least 2000 lb/100 ft$^2$, are suspended in the hydrophobic phase as discrete particles, and the aqueous phase is also suspended as discrete droplets in the hydrophobic phase, the hydrophobic continuous phase maintaining the water swellable clay granules and aqueous phase droplets separated during low shear pumping of the composite, the clay granules fragmenting during the application of high shear to the shear-thickening composite causing the aqueous phase to contact the fragmented clay granules to form said paste.

25. The composite of claim 24 wherein the water swellable clay granules are selected from the group consisting of granular montmorillonite clay and granular attapulgite clay with a particle size of between 10 to 60 mesh.

26. The composite of claim 24 wherein the oil comprises mineral oil, $C_6$ to $C_{1000}$ paraffinic oil, motor oil, substituted paraffinic oil wherein the substituents are selected from the group consisting of halogens, amines, sulfates, nitrates, carboxylates and hydroxyls.

27. The composite of claim 26 wherein the oil is $C_6$ to $C_{200}$ liquid paraffin oil.

28. The composite of claim 24 wherein the water soluble polymer is polyacrylamide, polymethacrylamide, polystyrene sulfonate, polyvinyl toluene sulfonate, polyethyleneoxide, or polyvinyl alcohol.

29. The composite of claim 27 wherein the water soluble polymer is polyacrylamide.

30. The composite of claim 29 wherein the polyacrylamide is hydrolyzed to a degree ranging from 0 to 50%.

31. The composite of claim 24 wherein the surfactant is the product obtained by the reaction of the polyamine:

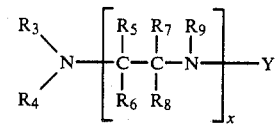

wherein $R_3$, $R_4$, $R_5$, $R_6$, $R_7$, $R_8$, $R_9$, and Y are selected from the group consisting of hydrogen, $C_1$ to $C_{20}$ alkyl, $C_6$ to $C_{20}$ aryl, $C_7$ to $C_{20}$ alkaryl radicals and substituted derivatives thereof and x is an integer of from 1 to 100 with polyalkenyl succinic anhydrides, reaction proceeding at the $R_3$, $R_4$ substituted nitrogen.

32. The composite of claim 31 wherein the polyalkenyl succinic anhydride is selected from the group consisting of polyisobutenyl succinic anhydride, polypropenyl succinic anhydride and polybutenyl succinic anhydride.

33. The composite of claim 32 wherein the surfactant is represented by the general formula:

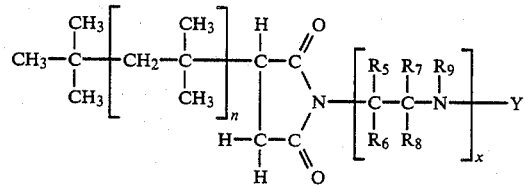

wherein n varies from 10 to 60, preferably 10 to 30, most preferably 15 to 17; x varies from 1 to 100, preferably 3 to 10; $R_5$, $R_6$, $R_7$, $R_8$, $R_9$ are hydrogen $C_1$ to $C_{20}$ alkyl, $C_6$ to $C_{20}$ aryl, $C_7$ is selected from the group consisting of hydrogen and oxygen substituted hydrocarbyl radicals having up to 10 carbons.

* * * * *

UNITED STATES PATENT AND TRADEMARK OFFICE
CERTIFICATE OF CORRECTION

PATENT NO. : 4,503,170
DATED : March 5, 1985
INVENTOR(S) : Evelyn N. Drake, Mary E. Morrison and Charles R. Dawson It is certified that error appears in the above—identified patent and that said Letters Patent is hereby corrected as shown below:

On the front page of the Patent, two assignees should be listed as follows:

[73] Assignees: Exxon Production Research Company and
Exxon Research and Engineering Company, Column 12, line 67, "dlrill" should read --drill--

Column 20, line 8, " $<$ 100 mesh" should read -- $>$ 100 mesh--

Signed and Sealed this

Twenty-fourth Day of December 1985

[SEAL]

Attest:

DONALD J. QUIGG

Attesting Officer     Commissioner of Patents and Trademarks